United States Patent
Nojiri et al.

(10) Patent No.: US 9,919,590 B2
(45) Date of Patent: Mar. 20, 2018

(54) OPENING TRIM WEATHERSTRIP

(71) Applicant: TOYODA GOSEI CO., LTD., Kiyosu-shi, Aichi-ken (JP)

(72) Inventors: Masatoshi Nojiri, Kiyosu (JP); Hirofumi Otsuka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/070,181

(22) Filed: Mar. 15, 2016

(65) Prior Publication Data

US 2016/0272056 A1 Sep. 22, 2016

(30) Foreign Application Priority Data

Mar. 19, 2015 (JP) .................................. 2015-055730

(51) Int. Cl.
| | | |
|---|---|---|
| B60J 10/00 | (2016.01) | |
| B60J 10/32 | (2016.01) | |
| B60J 10/248 | (2016.01) | |
| B60J 10/277 | (2016.01) | |
| B60J 10/84 | (2016.01) | |

(52) U.S. Cl.
CPC ............. *B60J 10/32* (2016.02); *B60J 10/248* (2016.02); *B60J 10/277* (2016.02); *B60J 10/84* (2016.02)

(58) Field of Classification Search
CPC ........ B60J 10/32; B60J 10/248; B60J 10/277; B60J 10/84
See application file for complete search history.

(56) References Cited

U.S. PATENT DOCUMENTS

| | | | |
|---|---|---|---|
| 7,281,354 B2 | 10/2007 | Nishihara | |
| 7,340,862 B2* | 3/2008 | Baratin | .................... B60J 10/24 49/475.1 |
| 9,061,573 B2* | 6/2015 | Zaccaria | ................ B60J 10/006 |
| 2013/0025211 A1 | 1/2013 | Zaccaria et al. | |
| 2014/0290143 A1 | 10/2014 | Yamada et al. | |

FOREIGN PATENT DOCUMENTS

| | | |
|---|---|---|
| JP | 2005-119350 A | 5/2005 |
| JP | 2011-189880 A | 9/2011 |
| JP | 2014-196052 A | 10/2014 |

OTHER PUBLICATIONS

Office Action dated Oct. 27, 2017 issued in corresponding CN patent application No. 201610153915.5 (and English translation).

* cited by examiner

*Primary Examiner* — Joseph D. Pape
(74) *Attorney, Agent, or Firm* — POSZ Law Group, PLC (57) ABSTRACT

An opening trim weatherstrip includes: a mounting base portion which is mounted on a flange; and a hollow seal portion, which is configured to be brought into abutment with a door frame or an outer circumference of a door panel of a motor vehicle door to seal a gap between the motor vehicle door and a vehicle body opening portion circumferential edge, including: a hollow root portion which is formed from the mounting base portion; and a hollow extension portion which is provided so as to extend transversely outwards from the hollow root portion; wherein a deformation rigidity of the hollow extension portion at a portion where the opening trim weatherstrip is mounted on a portion of the vehicle body opening portion circumferential edge which lies near a door hinge is higher than a deformation rigidity of the hollow extension portion at the other portion.

9 Claims, 6 Drawing Sheets

--PRIOR ART--

FIG. 10

--PRIOR ART--

OPENING TRIM WEATHERSTRIP

CROSS-REFERENCE TO RELATED APPLICATION

This application is based upon and claims the benefit of priority from Japanese Patent Application No. 2015-055730, filed on Mar. 19, 2015, the entire contents of which are incorporated herein by reference.

BACKGROUND

1. Field of the Invention

The present invention relates to an opening trim weatherstrip for a motor vehicle. The opening trim weatherstrip seals a gap defined between a motor vehicle door and a vehicle body opening portion circumferential edge.

2. Description of the Related Art

Figure 7:
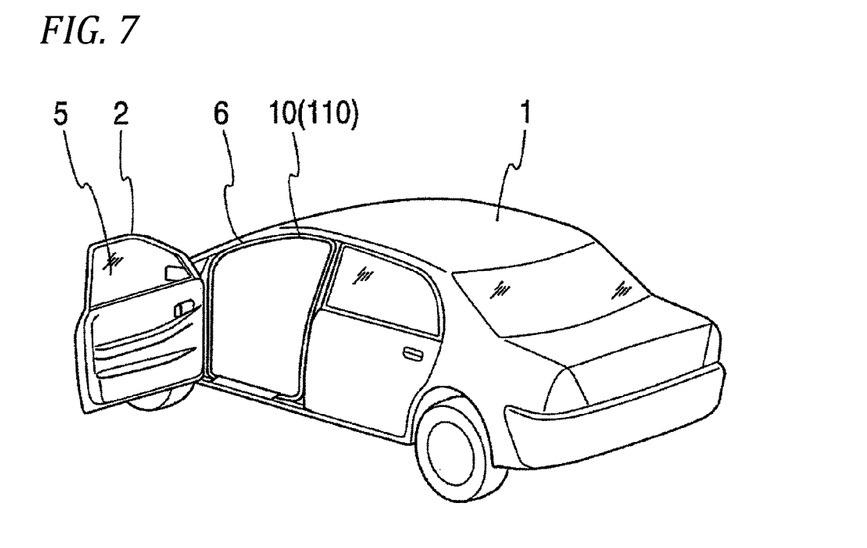
FIG. 7 is a perspective view of a motor vehicle with its door opened as seen obliquely from the rear thereof.

Conventionally, a seal between a door of a motor vehicle and a vehicle body opening portion circumferential edge is made by a glass run (not shown) which is mounted in an inner circumferential channel (not shown) of a door frame 2 of the door, an opening portion weatherstrip (not shown) which is mounted near an opening defined by a vehicle body opening portion circumferential edge 6, and an opening trim weatherstrip 110, which will be described later, mounted on a flange 7 of the vehicle body opening portion circumferential edge 6, as shown in FIG. 7.

Figure 8:
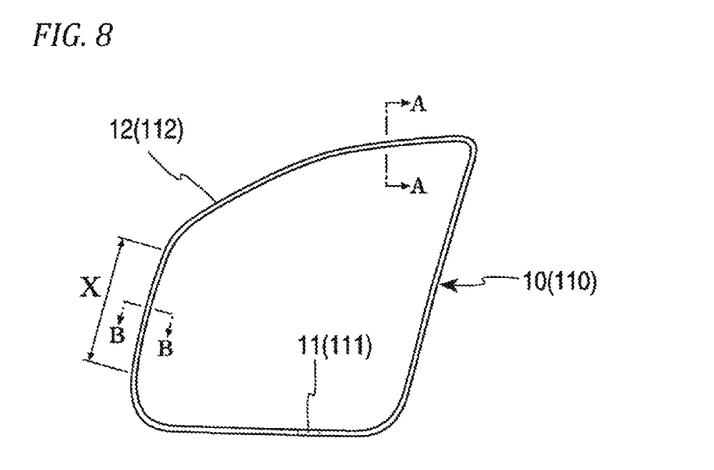
FIG. 8 is a front view of the door opening trim weatherstrip according to the embodiments of the invention.
Figure 9:
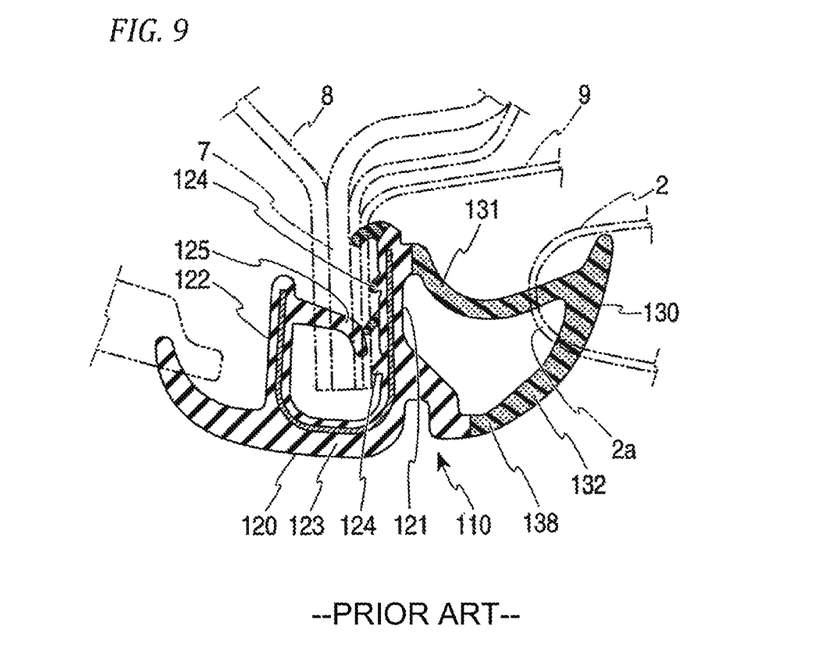
FIG. 9 is a cross-sectional view showing a state in which a conventional door opening trim weatherstrip is mounted on an opening portion circumferential edge of a motor vehicle.

As shown in FIGS. 7 and 8, the opening trim weatherstrip 110 is formed of a single extruded part, which is connected into a ring-like shape at a connecting portion 111 for mounting along almost the full circumference of the vehicle body opening portion circumferential edge 6 of a vehicle body. Then, when the door is closed, the opening trim weatherstrip 110 is brought into abutment with the door frame 2 or an outer circumference of a door panel to form a seal. As shown in FIG. 9, the flange 7 is provided on the vehicle body opening portion circumferential edge 6, and the opening trim weatherstrip 110 is mounted on the flange 7. The flange 7 is formed as a result of distal ends of an inner panel 8 and an outer panel 9 being secured together through welding.

The opening trim weatherstrip 110 has a hollow seal portion 130 and a mounting base portion (a trim portion) 120. The trim portion 120 has a substantially U-shaped cross section and is mounted on the flange 7 via the mounting base portion (the trim portion) 120, as shown in FIG. 9. This trim portion 120 has the substantially U-shaped cross section, which is formed by an outboard side wall 121, an inboard side wall 122 and a bottom wall 123 (refer to JP-A-2011-189880, for example).

As shown in FIG. 9, an outboard holding lip 124 and an inboard holding lip 125 are formed inner surfaces of the U-shaped cross section formed by the outboard side wall 121 and the inboard side wall 122, respectively, for holding the flange 7 therebetween. When the flange 7 is inserted into the trim portion 120, distal ends of the outboard holding lip 124 and the inboard holding lip 125 flex to be brought into pressing contact with individual side surfaces of the flange 7 to hold the flange 7 therebetween, whereby the opening trim weatherstrip 110 can be mounted on the flange 7.

The hollow seal portion 130 is made up of a first side seal wall 131, which makes up a side wall on a root side of the flange 7, and a second side seal wall 132, which makes up a side wall on a distal end side of the flange 7. The hollow seal portion 130 is brought into abutment with the door frame 2 to seal a gap between the door and the vehicle body opening portion circumferential edge 6 when the door is closed, and a bending portion 138 is formed on the second side seal wall 132 to lessen the door closing force.

Because of this, a door frame protuberant portion 2a of the door frame 2 is brought into abutment with the hollow seal portion 130 as shown in FIG. 9, the bending portion 138 flexes such that it is folded, allowing the hollow seal portion 130 to flex. Although this can diminish the door closing force, the sealing performance is reduced when the contact pressure under which the hollow seal portion 130 is brought into abutment with the door frame protuberant portion 2a is reduced.

Figure 10:
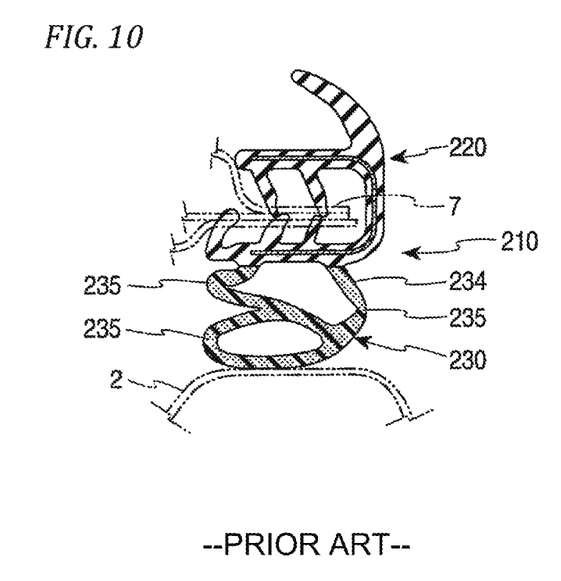
FIG. 10 is a cross-sectional view showing a state in which another conventional door opening trim weatherstrip is mounted on the opening portion circumferential edge of the motor vehicle.

Because of this, as shown in FIG. 10, there is provided an opening trim weatherstrip 210 including a trim portion 220, which is mounted on a flange 7, and a hollow seal portion 230, which is made up of two hollow portions: a hollow root portion 234 and a hollow extension portion 235 (refer to JP-A-2005-119350, for example). In this case, bending portions 235, 235 are provided on a seal wall of the hollow root portion 234 of the hollow seal portion 230 to ensure both the reduction in door closing force and the sealing performance.

However, since the opening trim weatherstrip 210 is mounted along the full circumference of a vehicle body opening portion circumferential edge 6, the direction in which the door frame 2 is brought into abutment with the hollow extension portion 235 of the opening trim weatherstrip 210 differs depending on locations on the vehicle body opening portion circumferential edge 6. Because of this, it is difficult to provide a proper counter-measure against the drawback that the contact pressure under which the hollow seal portion 230 is brought into abutment with the door differs depending on locations on the vehicle body opening portion circumferential edge 6.

SUMMARY

Thus, an object of the invention is to provide a motor vehicle opening trim weatherstrip which can not only ensure an appropriate contact pressure according to a mounting location but also ensure a required sealing performance.

According to a first aspect of the invention, there is provided an opening trim weatherstrip, configured to be mounted on a flange formed along a vehicle body opening portion circumferential edge of a motor vehicle to seal a gap between a motor vehicle door and the vehicle body opening portion circumferential edge, the opening trim weatherstrip including: a mounting base portion which is mounted on the flange; and a hollow seal portion which is provided integrally with the mounting base portion and which is configured to be brought into abutment with a door frame or an outer circumference of a door panel of the motor vehicle door to seal a gap between the motor vehicle door and the vehicle body opening portion circumferential edge, the hollow seal portion including: a hollow root portion which is formed from the mounting base portion; and a hollow extension portion which is provided to extend transversely outwards from the hollow root portion; wherein a deformation rigidity of the hollow extension portion of the hollow seal portion at a portion where the opening trim weatherstrip is mounted on a portion of the vehicle body opening portion circumferential edge which lies near a door hinge is higher than a deformation rigidity of the hollow extension portion at the other portion.

According to the first aspect of the invention, the opening trim weatherstrip has the mounting base portion which is mounted on the flange and the hollow seal portion which is provided integrally with the mounting base portion and which is configured to be brought into abutment with the door frame or the outer circumference of the door panel of the motor vehicle door to seal the gap between the motor vehicle door and the vehicle body opening portion circumferential edge. Because of this, when the mounting base portion is mounted on the flange, the hollow seal portion is brought into abutment with the door frame or the outer circumference of the door panel to thereby seal the gap between the door frame or the outer circumference of the door panel and the vehicle body opening portion circumferential edge. Since the hollow seal portion has the hollow shape, even though the assemblage of the door varies, the hollow seal portion is brought into soft abutment with a wide portion of a protuberant portion of the door frame in an ensured fashion, thereby making it possible to ensure the sealing performance.

The hollow seal portion is formed of the hollow root portion which is formed from the mounting base portion and the hollow extension portion which is provided to extend transversely outwards from the hollow root portion. Because of this, the hollow root portion is fixed to the mounting base portion in an ensured fashion, and the hollow extension portion is allowed to flex to be brought into abutment with the door separately from the hollow root portion, thereby making it possible to ensure the sealing performance between the door and the vehicle body opening portion circumferential edge.

The deformation rigidity of the hollow extension portion of the hollow seal portion at the portion where the opening trim weatherstrip is mounted on the portion of the vehicle body opening portion circumferential edge which lies near the door hinge is made higher than the deformation rigidity of the hollow extension portion at the other portion. Because of this, the contact pressure under which the hollow extension portion is brought into abutment with the door in the portion which is near the door hinge is enhanced, whereby the reduction in sealing force between the door and the vehicle body opening portion circumferential edge can be prevented which would otherwise be caused by the difference in direction in which the door is closed.

According to a second aspect of the invention, in the opening trim weatherstrip according to the first aspect, the hollow extension portion of the hollow seal portion where the deformation rigidity of the hollow extension portion of the hollow seal portion is made higher than the deformation rigidity of the hollow extension portion at the other portion is formed thicker than a thickness of the hollow extension portion at the other portion.

According to the second aspect of the invention, the hollow extension portion of the hollow seal portion where the deformation rigidity of the hollow extension portion of the hollow seal portion is made higher than the deformation rigidity of the hollow extension portion at the other portion is formed thicker than the thickness of the hollow extension portion of the hollow seal portion at the other portion. Because of this, the deformation rigidity of the hollow extension portion is enhanced higher than that of the hollow extension portion at the other portion by forming the hollow extension portion thicker through extrusion molding, whereby the contact pressure of the hollow extension portion is enhanced, thereby making it possible to ensure the sealing performance.

According to a third aspect of the invention, in the opening trim weatherstrip according to the second aspect, the portion of the hollow extension portion of the hollow seal portion which is formed thicker than the thickness of a seal wall of the extension portion at the other portion is formed thicker over the whole of the seal wall of the hollow extension portion.

According to the third aspect of the invention, the portion of the hollow extension portion of the hollow seal portion which is formed thicker than the thickness of the seal wall of the hollow extension portion at the other portion is formed thicker over the whole of the seal wall of the hollow extension portion. This enhances the deformation rigidity of the whole of the seal wall of the hollow extension portion near the door hinge in an ensured fashion, thereby making it possible to ensure the sealing performance.

According to a fourth aspect of the invention, in the opening trim weatherstrip according to the second aspect, the portion of the hollow extension portion of the hollow seal portion which is formed thicker than the thickness of a seal wall of the hollow extension portion at the other portion is formed thicker on one of seal walls of the hollow extension portion.

According to the fourth aspect of the invention, the portion of the hollow extension portion of the hollow seal portion which is formed thicker than the thickness of the seal wall of the hollow extension portion at the other portion is formed thicker on one of the seal walls of the hollow extension portion. This can enhance the deformation rigidity of the hollow extension portion near the door hinge to something like the required level, thereby making it possible to ensure the sealing performance without increasing the door closing force.

According to a fifth aspect of the invention, in the opening trim weatherstrip according to the first aspect, in the portion of the hollow extension portion of the hollow seal portion where the deformation rigidity of the hollow extension portion of the hollow seal portion is made higher than the deformation rigidity of the hollow extension portion at the other portion, a seal wall near a boundary between the hollow extension portion and the hollow root portion of the hollow seal portion is formed thicker than a thickness of a seal wall near the boundary between the hollow extension portion and the hollow root portion of the hollow seal portion at the other portion.

According to the fifth aspect of the invention, in the opening trim weatherstrip according to the first aspect, in the portion of the hollow extension portion of the hollow seal portion where the deformation rigidity of the hollow extension portion of the hollow seal portion is made higher than the deformation rigidity of the hollow extension portion at the other portion, the seal wall near the boundary between the hollow extension portion and the hollow root portion of the hollow seal portion is formed thicker than the thickness of the seal wall near the boundary between the hollow extension portion and the hollow root portion of the hollow seal portion at the other portion. This makes it difficult for the hollow extension portion to flex when the hollow extension portion flexes relative to the hollow root portion as a result of the door being brought into abutment with the hollow seal portion, whereby the deformation rigidity is enhanced, thereby making it possible to ensure the sealing performance.

According to a sixth aspect of the invention, in the opening trim weatherstrip according to anyone of the first to fifth aspects, the portion of the hollow extension portion of the hollow seal portion where the thickness of the seal wall is formed thicker and the hollow extension portion at the other portion are formed so that the thickness changes gradually.

According to the sixth aspect of the invention, the portion of the hollow extension portion of the hollow seal portion where the thickness of the seal wall is formed thicker and the hollow extension portion at the other portion are formed so that the thickness changes gradually. This allows the hollow extension portion to flex smoothly at the boundary portion between the portion of the hollow extension portion of the hollow seal portion where the thickness of the seal wall is formed thicker and the hollow extension portion at the other portion when the hollow extension portion flexes relative to the hollow root portion as a result of the door being brought into abutment with the hollow seal portion, thereby making it possible to ensure the sealing performance.

According to a seventh aspect of the invention, in the opening trim weatherstrip according to anyone of the first to sixth aspects, the hollow root portion and the hollow extension portion of the hollow seal portion are divided by a bulkhead portion, or holding wall.

According to the seventh aspect of the invention, the hollow root portion and the hollow extension portion of the hollow seal portion are divided by the bulkhead portion, or holding wall. Because of this, the hollow extension portion is given the hollow shape, whereby the deformation rigidity of the hollow extension portion is enhanced, thereby making it possible to ensure the sealing performance.

According to an eighth aspect of the invention, in the opening trim weatherstrip according to anyone of the first to sixth aspects, the hollow root portion and the hollow extension portion of the hollow seal portion is formed to communicate with each other.

According to the eighth aspect of the invention, the hollow root portion and the hollow extension portion of the hollow seal portion is formed to communicate with each other. This can reduce the deformation rigidity of the hollow extension portion, thereby making it possible to reduce the door closing force of the portions other than the portion near the door hinge.

According to a ninth aspect of the invention, in the opening trim weatherstrip according to anyone of the first to eighth aspects, a bending portion is formed on a hollow seal wall at the boundary between the hollow root portion and the hollow extension portion of the hollow seal portion.

According to the ninth aspect of the invention, the bending portion is formed on a hollow seal wall at the boundary between the hollow root portion and the hollow extension portion of the hollow seal portion. This can reduce the flexing load of the hollow seal of the whole of the opening trim weatherstrip, thereby making it possible to reduce the door closing force.

According to a tenth aspect of the invention, in the opening trim weatherstrip according to anyone of the first to ninth aspects, the mounting base portion has a substantially U-shaped cross section made up or an outboard side wall, an inboard side wall and a bottom wall.

According to the tenth aspect of the invention, the mounting base portion has the substantially U-shaped cross section made up of the outboard side wall, the inboard side wall and the bottom wall. This enables the flange to be held in an interior of the substantially U-shaped cross section while holding the flange strongly and rigidly by an outboard holding lip and an inboard holding lip which are formed in an interior defined by an outboard side wall and an inboard side wall therebetween.

The deformation rigidity of the hollow extension portion of the hollow seal portion at the portion on the vehicle body opening portion circumferential edge where the opening trim weatherstrip is mounted near the door hinge is made higher than the deformation rigidity of the hollow extension portion at the other portion. Therefore, it is possible to prevent the reduction in sealing force between the door and the vehicle body opening portion circumferential edge near the door hinge which would otherwise be caused by the difference in door closing direction.

BRIEF DESCRIPTION OF THE DRAWINGS

The present invention will become more fully understood from the detailed description given hereinbelow and the accompanying drawings, which are given by way of illustration only, and thus are not limitative of the present invention and wherein.

DETAILED DESCRIPTION OF THE INVENTION

Embodiments of the invention will be described based on FIGS. 1 to 8.

As shown in FIG. 7, a vehicle body 1 of a motor vehicle has a door opening portion, and the door opening portion is opened and closed by a door which is an opening and closing member. A circumference of the door opening portion constitutes a vehicle body opening portion circumferential edge 6. A flange 7 is formed along the vehicle body opening portion circumferential edge 6 by welding together distal ends of an outer panel 9 and an inner panel 8 which make up the vehicle body 1 (refer to FIGS. 1, 2). In the flange 7, the number of panels which are welded together varies from two to on the order of eight depending on locations on the vehicle body opening portion circumferential edge 6 of the vehicle body 1.

A seal between the door and the vehicle body opening portion circumferential edge 6 is mounted on a channel of the door, and is effected by a glass run (not shown) which effects a seal between a door glass 5 and an inner circumference of a door frame 2, an opening portion weatherstrip (not shown) which seals an opening side of the vehicle body opening portion circumferential edge 6 and an opening trim weatherstrip 10 which is mounted on the flange 7 to seal a portion lying further inwards than the portion sealed by the opening portion weatherstrip.

This invention relates to the opening trim weatherstrip 10. The opening trim weatherstrip 10 is formed into a straight line through extrusion molding. The single opening trim weatherstrip 10, which is formed into the straight line, is mounted on the flange 7 along the shape of the vehicle body opening portion circumferential edge 6 into a ring-like shape as shown in FIG. 8. The opening trim weatherstrip 10 is mounted on the flange 7 from one end thereof, and when the opening trim weatherstrip 10 is completely mounted on the flange 7, the other end is joined to the one end thereof. These ends may be joined together into a ring-like shape in a mold by the connecting portion 11.

In addition, the ends of the opening trim weatherstrip 10 may be bonded together with an adhesive before the opening trim weatherstrip 10 is mounted on the flange 7.

Figure 1:
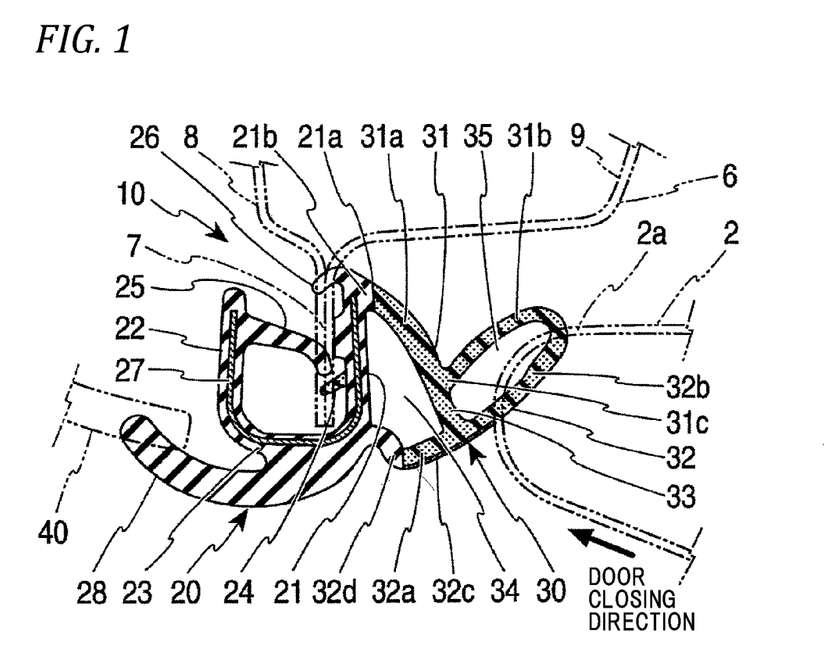
FIG. 1 is a cross-sectional view taken along a line A-A in FIG. 8 which shows a state in which an opening trim weatherstrip of a first embodiment of the invention is mounted on a flange.
Figure 2:
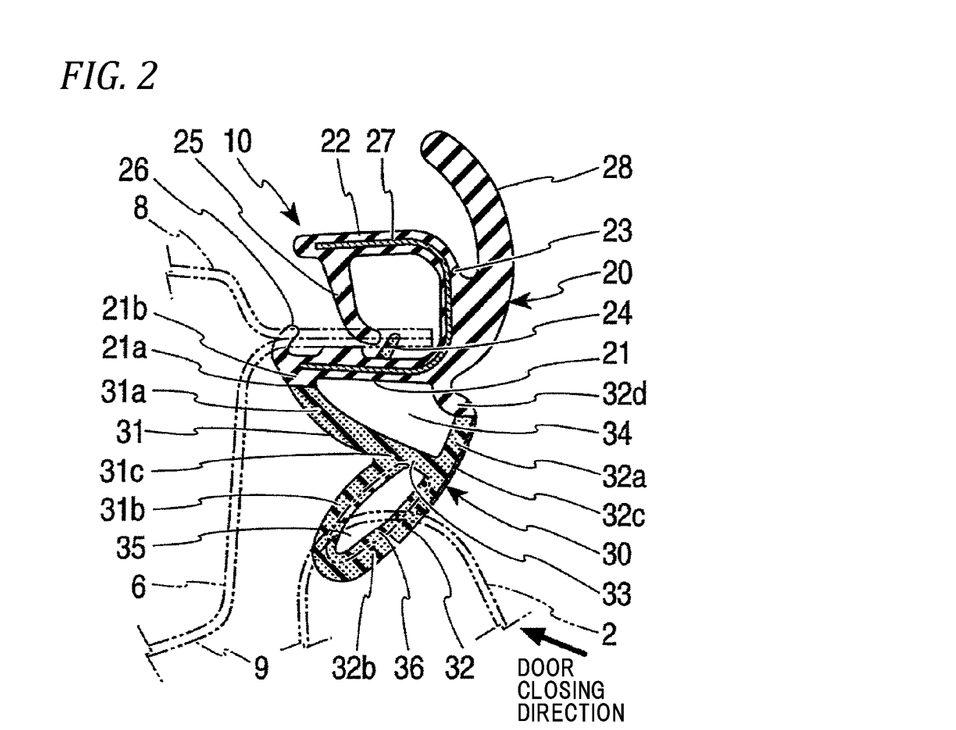
FIG. 2 is a cross-sectional view taken along a line B-B in FIG. 8 which shows a state in which the opening trim weatherstrip of the first embodiment of the invention is mounted on a portion of the flange which lies near a door hinge.

As shown in FIGS. 1 and 2, the opening trim weatherstrip 10 has a trim portion (a mounting base portion) 20 having a substantially U-shaped cross section and a hollow seal portion 30 having a hollow configuration. The trim portion 20 is mounted on the flange 7. The hollow seal portion 30 is formed integrally from the trim portion 20 and constitutes a seal portion, which is brought into abutment with a door frame protuberant portion 2*a* of the door frame 2 to seal a gap between the door and the vehicle body opening portion circumferential edge 6. The embodiments of the invention will be described as being applied to the opening trim weatherstrip 10, which is brought into abutment with the door frame 2.

In this invention, the hollow seal portion 30 is provided integrally on an outer surface of an outboard side wall 21 of the trim portion 20. The hollow seal portion 30 will be described later.

The trim portion 20, which is the mounting base portion, includes the outboard side wall 21, an inboard side wall 22 and a bottom wall 23 and has the substantially U-shaped cross section. An insert member 27 is embedded in an interior of the trim portion 20 to increase the strength with which the trim portion 20 holds the flange 7. The insert member 27 is formed from a metallic plate or a hard resin and is formed into a ladder shape, a fishbone shape, or a zigzag shape to ensure flexibility when the trim portion 20 is mounted on corner portions of the flange 7. The trim portion 20 is formed of a solid material or a fine foamed material.

An outboard holding lip 24 and an inboard holding lip 25 are provided on inner surfaces of the outboard side wall 21 and the inboard side wall 22, respectively, to extend in a longitudinal direction to thereby hold the flange 7 therebetween. To make this happen, respective distal ends of the outboard holding lip 24 and the inboard holding lip 25 are brought into both side surfaces of the flange 7 to hold the flange 7 strongly and rigidly. This prevent the collapse of the trim portion 20, which allows the hollow seal portion 30 to be brought into abutment with the door frame 2 in an ensured fashion, thereby making it possible to ensure a required sealing performance.

The inboard holding lip 25 of this embodiment is formed into a single long strip. This enables the inboard holding lip 25 to flex to cause the flange 7 to be brought into press contact with the outboard side wall 21 although the thickness of the flange 7 varies, whereby the flange 7 can be held stably by the inboard holding lip 25. The distal end of the inboard holding lip 25 is formed to be bent in the direction of the bottom wall 23 to facilitate the holding of the flange 7.

The outboard holding lip 24 of this embodiment is formed into a single short strip when it is extruded, and the inboard holding lip 25 is formed into the single long strip to project obliquely into an interior of the substantially U-shaped cross section. Because of this, the flange 7 is positioned on an inner surface side of the outboard side wall 21 and is held by the outboard holding lip 24. In addition, the inboard holding lip 25 can follow the flange 7 well enough to be brought into abutment with the flange 7 in an ensured fashion even though the flange 7 has irregularities or curves, thereby making it possible to ensure the sealing performance.

A cover lip 28 is provided at a connecting portion between the inboard side wall 22 and the bottom wall 23 to extend inwards to cover a distal end of a garnish 40 attached inside the vehicle.

An outboard seal lip 26 is provided at a distal end of the outboard side wall 21 to be brought into abutment with the flange 7. Because of this, as shown in FIG. 1, when the trim portion 20 is mounted on the flange 7, the outboard seal lip 26 is brought into abutment with a root portion of the flange 7 to thereby fill a gap between the outer panel 9 and the outboard side wall 21, whereby rain water flowing in along the outer panel 9 can be prevented from entering an interior of a passenger compartment from the gap between the outer panel 9 and the outboard side wall 21.

Next, the hollow seal portion 30 constituting the seal portion will be described. Firstly, a first embodiment of the invention will be described based on FIGS. 1 and 2, and thereafter, second to fifth embodiments will be described based on FIGS. 3 to 6. In the first to fifth embodiment of the invention, the configuration of the trim portion 20, which is the mounting base portion, remains the same as described above.

A cross-sectional shape of the hollow seal portion 30 differs between a section X of the weatherstrip 10 that is mounted on a portion of the circumferential edge 6 that is near a door hinge and a section that is mounted on a portion of the circumferential edge 6 other than the portion near the door hinge (a section not mounted near the door hinge). Firstly, a cross-sectional shape of the section of the weatherstrip 10 not mounted near the door hinge will be described based on FIG. 1, and a cross-sectional shape of the section X of the weatherstrip 10 that is mounted near the door hinge will be described based on FIG. 2.

A hollow seal portion 30 according to the first embodiment of the invention is formed of two hollow portions. The hollow seal portion 30 is formed of a hollow root portion 34 and a hollow extension portion 35. The hollow root portion 34 is formed integrally from the outboard side wall 21 of the trim portion 20, and the hollow extension portion 35 is formed from the hollow root portion 34. The hollow seal portion 30 is formed of a first side seal wall 31, which extends from the vicinity of the distal end of the outboard side wall 21, and a second side seal wall 32, which extends from the vicinity of a connecting portion between the outboard side wall 21 and the bottom wall 23.

It is preferable that the hollow seal portion 30 is formed of a sponge material having a specific gravity of 0.5 to 0.7. In this case, the hollow seal portion 30 has flexibility and can be brought into abutment with the door frame 2 of the motor vehicle's door as the door frame 2 varies, thereby making it possible to ensure the sealing performance between the door frame 2 and the hollow seal portion 30. Further, the hollow seal portion 30 so formed can reduce the overall weight of the opening trim weatherstrip 10, contributing to the reduction in weight of the motor vehicle.

In the first side seal wall 31, a first side seal wall root portion 31a extends from the outboard side wall 21 and bends at a first side seal wall bending portion 31c, and a first side seal wall distal end portion 31b is formed at a distal end side.

In the second side seal wall 32, a second side seal wall holding portion 32d is formed to bend from the outboard side wall 21, and a second side seal wall root portion 32a and a second side seal wall distal end portion 32b extend from the second side seal wall holding portion 32 into an arc-like shape.

The first side seal wall root portion 31a connects to a connecting surface 21a of a extension portion 21b of the outboard side wall 21 at a distal end thereof at the hollow root portion 34 and connects to a hollow holding wall 33 at the first side seal wall bending portion 31c. The hollow holding wall 33 is joined integrally to a connecting portion between the second side seal wall root portion 32a and the second side seal wall distal end portion 32b.

Due to this configuration, the hollow root portion 34 is formed into a hollow wall by the first side seal wall root portion 31a, the hollow holding wall 33, the second side seal wall root portion 32a and the second side seal wall holding portion 32d and the outboard side wall 21. The second side seal wall holding portion 32d is formed of the same solid material as that of the outboard side wall 21 and the other portions are formed of a sponge material.

The hollow extension portion 35 is formed into a hollow wall by the first side seal wall distal end portion 31b, the second side seal wall distal end portion 32b and the hollow holding wall 33 with distal ends of the first side seal wall distal end portion 31b and the second side seal wall distal end portion 32b joined together.

A second side seal wall skin layer 32c, which is formed of a solid material, is formed on an outer surface of the second side seal wall root portion 32a and a root side outer surface of the second side seal wall distal end portion 32b. Because of this, a surface of the second side seal wall 32 becomes smooth, improving the external appearance thereof.

The hollow extension portion 35 is formed to bend relative to the hollow root portion 34 at a portion where the first side seal wall bending portion 31c is provided. Since the hollow extension portion 35 is formed to bend relative to the hollow root portion 34, when the door frame 2 is brought into abutment with the hollow extension portion 35, the door is brought into abutment with the hollow extension portion 35 from a lateral direction (a direction indicated by an arrow in FIG. 1) of the hollow extension portion 35. Therefore, the hollow extension portion 35 flexes at the bending portion to reduce the flexing load of the hollow seal portion 30, thereby making it possible to lessen the door closing force.

Next, the cross-sectional shape of the hollow seal portion 30 of the section X of the weatherstrip 10 that is mounted near the door hinge will be described based on FIG. 2. The section X of the weatherstrip 10 that is mounted near the door hinge is shown in FIG. 8. At the section X of the weatherstrip 10, the door is brought into abutment with the hollow extension portion 35 from a direction (a direction indicated by an arrow in FIG. 2) that is at right angles to the surface of the second side seal wall distal end portion 32b of the extension portion 35 when the door is closed. Therefore, a reaction force resulting when the hollow extension portion 35 deforms is small, and the contact pressure resulting when the door is brought into abutment with the hollow extension portion 35 becomes small, which reduces the sealing performance.

Because of this, in the section X of the weatherstrip 10 that is near the door hinge, the deformation rigidity of a portion of the hollow extension portion 35 where the opening trim weatherstrip 10 is mounted on a portion of the vehicle body opening portion circumferential edge 6 is made higher than that of the remaining portion of the hollow extension portion 35. This can prevent the reduction in sealing force between the door and the vehicle body opening portion circumferential edge 6 that would otherwise be caused by the difference in direction in which the door is closed near the door hinge.

In the first embodiment of the invention, since the deformation rigidity of the hollow extension portion 35 is set high, the first side seal wall distal end portion 31b and the second side seal wall distal end portion 32b, which constitute a seal wall of the hollow extension portion 35, are formed with an increased thickness over the full length thereof than the remaining portions. A hollow seal portion thick portion 36 is formed on an interior side of the hollow extension portion 35, thus reducing the size of the hollow interior space, as shown in FIG. 2, as compared to the hollow interior space shown in FIG. 1. The hollow seal portion thick portion 36 is formed by using a variable die when extruding the opening trim weatherstrip 10.

Because of this, the deformation rigidity of the whole of the portion of the seal wall of the hollow extension portion 35 that lies near the door hinge is reliably increased, thereby making it possible to ensure the sealing performance.

Figure 3:
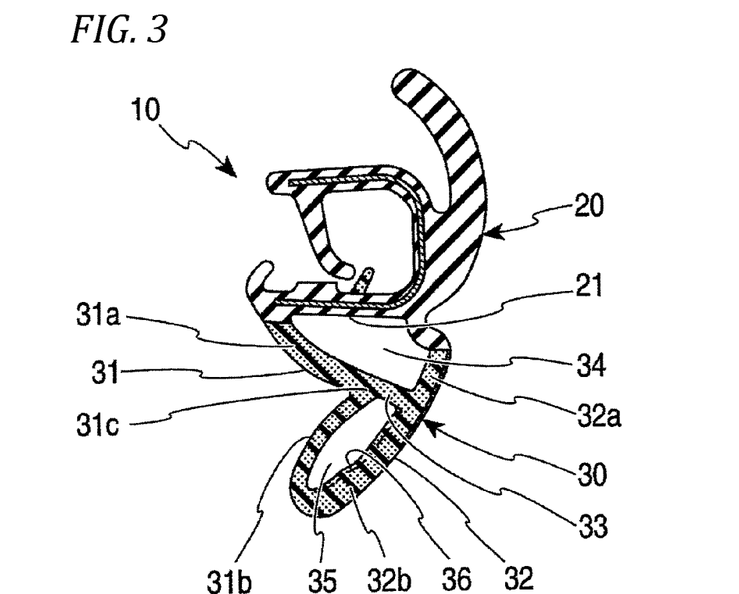
FIG. 3 is a cross-sectional view taken along the line B-B in FIG. 8 which shows an opening trim weatherstrip according to a second embodiment of the invention.

Next, a second embodiment of the invention will be described based on FIG. 3. The second embodiment differs from the first embodiment in the shape a hollow seal portion thick portion 36 of a hollow extension portion 35 and is otherwise similar to the first embodiment. Thus, only the differences will be described, whereas the description of the similar portions will be omitted.

In the second embodiment, the hollow seal portion thick portion 36 of the hollow extension portion 35 is formed only on a second side seal wall distal end portion 32b.

Because of this, only the side of the hollow extension portion 35 that is made up of the second side seal wall distal end portion 32b and with which a door is brought into abutment when the door is closed is formed with an increased thickness, whereby the deformation rigidity of the portion of the hollow extension portion 35 that lies near a door hinge can be increased as required. Consequently, the sealing performance can be ensured without increasing the door closing force greatly by controlling the door closing force.

Figure 4:
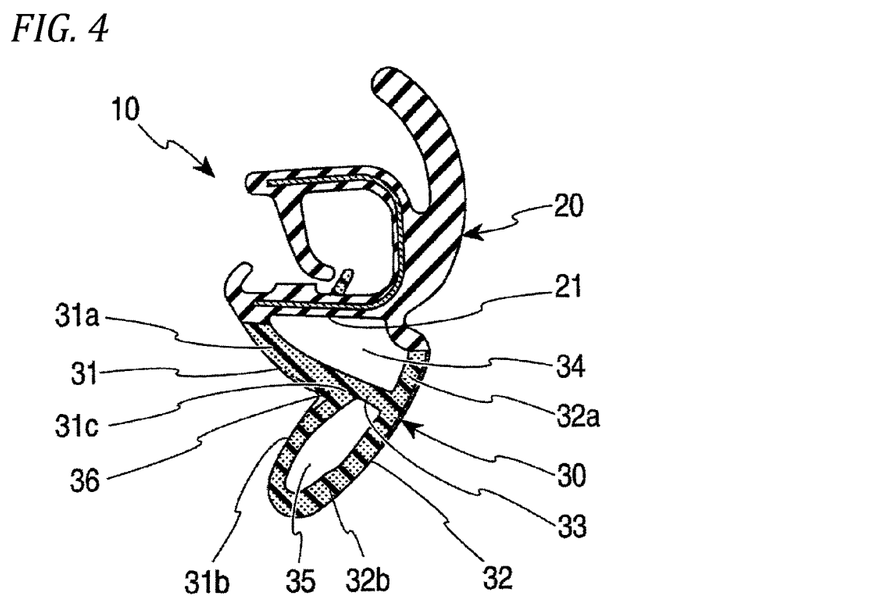
FIG. 4 is a cross-sectional view taken along the line B-B in FIG. 8 which shows an opening trim weatherstrip according to a third embodiment of the invention.

Next, a third embodiment of the invention will be described based on FIG. 4. The third embodiment differs from the first embodiment in the shape a hollow seal portion thick portion 36 of a hollow extension portion 35 and is otherwise similar to the first embodiment. Thus, only the differences will be described, whereas the description of the similar portions will be omitted.

In the third embodiment, the hollow seal portion thick portion 36 of the hollow extension portion 35 is formed only on a first side seal wall root portion 31*a* and a first side seal portion distal end portion 31*b* about a first side seal wall bending portion 31*c* on an outer surface of a first side seal wall 31.

Since the door is brought into abutment with the hollow extension portion 35 from a lateral direction when the door is closed, the hollow extension portion 35 bends at the portion where the first side seal wall bending portion 31*c* is provided when the hollow extension portion 35 deforms. However, since the hollow seal portion thick portion 36 is formed on the portion where the first side seal wall root portion 31*a* is provided and the portion where the first side seal wall distal end portion 31*b* is provided about the first side seal wall bending portion 31*c*, the reaction force resulting when the hollow extension portion 35 bends becomes great. Because of this, the deformation rigidity of the hollow extension portion 35 near the door hinge is reliably increased, thereby making it possible to ensure the sealing performance.

Figure 5:
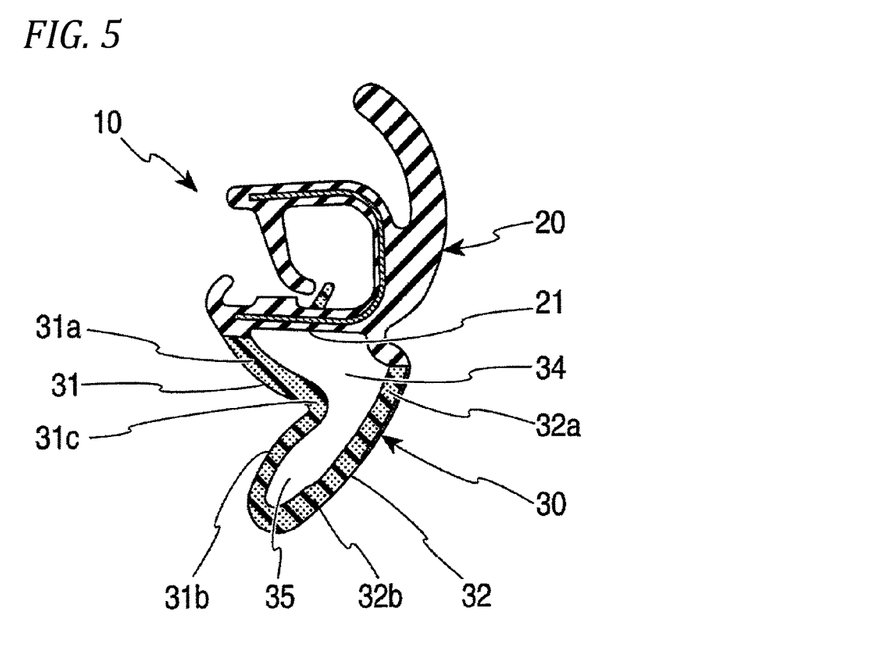
FIG. 5 is a cross-sectional view taken along the line A-A in FIG. 8 which shows an opening trim weatherstrip according to a fourth embodiment of the invention.

Next, a fourth embodiment of the invention will be described based on FIG. 5. The fourth embodiment differs from the first embodiment in that a hollow holding wall 33 is not formed between a hollow root portion 34 and a hollow extension portion 35 and is otherwise similar to the first embodiment. Thus, only the differences will be described, whereas the description of the similar portions will be omitted.

In the fourth embodiment, a hollow holding wall 33, which is formed between a hollow root portion 34 and a hollow extension portion 35 of a hollow seal portion 30, is not formed over the full length of the opening trim weatherstrip 10. Hence, the hollow root portion 34 and the hollow extension portion 35 are formed to communicate with each other. Because of this, although the door is brought into abutment with the hollow extension portion 35 when the door is closed, when the hollow extension portion 35 deforms, in the hollow extension portion 35, a first side seal wall bending portion 31*c* bends easily towards the hollow interior. Consequently, the deformation rigidity of the hollow extension portion 35 is reduced, whereby the door closing force at portions other than a portion lying near a door hinge can be reduced.

In the fourth embodiment, since the deformation rigidity of the hollow extension portion 35 needs to be increased at the section X of the weatherstrip 10 lying near the door hinge, a hollow seal portion thick portion 36 is formed (not shown). The method of forming the hollow seal portion thick portion 36 according to any of the first to third embodiments can be used when the hollow seal portion thick portion 36 is formed. This can increase the deformation rigidity of the hollow extension portion 35 near the door hinge in ensured reliable fashion, thereby making it possible to ensure the sealing performance.

Figure 6:
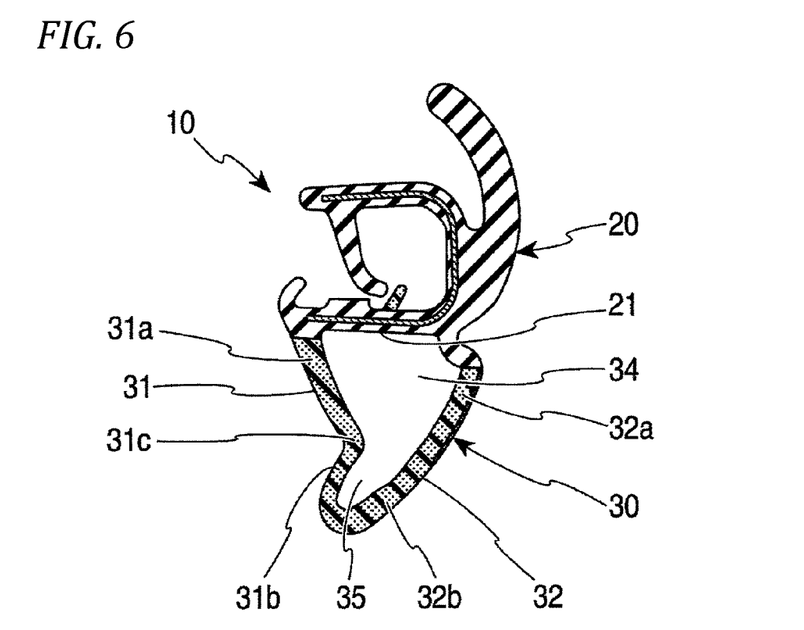
FIG. 6 is a cross-sectional view taken along the line A-A in FIG. 8 which shows an opening trim weatherstrip according to a fifth embodiment of the invention.

Next, a fifth embodiment of the invention will be described based on FIG. 6. The fifth embodiment differs from the fourth embodiment in the shape of a first side seal wall 31 and is similar to the fourth embodiment in that a hollow holding wall 33 is not formed between a hollow root portion 34 and a hollow extension portion 35 and in the other portions. Therefore, only the differences will be described, and the description of the similar portions will be omitted.

The fifth embodiment differs in that a first side seal wall root portion 31*a* of the first side seal wall 31 is long and a first side seal wall distal end portion 31*b* of the first side seal wall 31 is short over the full length of an opening trim weatherstrip 10 and in that a bending angle of a first side seal wall bending portion 31*c* is great. The fifth embodiment is similar to the fourth embodiment in that a hollow holding wall 33 is not formed between the hollow root portion 34 and the hollow extension portion 35 of the hollow seal portion 30. Hence, the hollow root portion 34 and the hollow extension portion 35 are formed to communicate with each other.

Because of this, the size of the hollow extension portion 35 is smaller than that of the fourth embodiment. A door is brought into abutment with the hollow extension portion 35 when the door is closed. However, when the hollow extension portion 35 deforms, it is more difficult for the first side seal wall bending portion 31*c* to bend towards a hollow interior in the fifth embodiment than in the fourth embodiment. Consequently, the deformation rigidity of the hollow extension portion 35 becomes greater in the fifth embodiment than in the fourth embodiment, whereby it is possible to reduce the door closing force at sections of the weatherstrip 10 other than the section X lying near the door hinge. In addition, since the hollow holding wall 33 is not provided, the deformation rigidity of the hollow extension portion 35 in the fifth embodiment is smaller than those of the first to third embodiments.

Because of this, as in the case with the fourth embodiment, in the fifth embodiment, since the deformation rigidity of the hollow extension portion 35 needs to be increased at the section X of the weatherstrip lying near the door hinge, the hollow seal portion thick portion 36 is formed (not shown). Any of the forming methods of the first to third embodiments can be used to form the hollow seal portion thick portion 36. This increases the deformation rigidity of the hollow extension portion 35 at the section X of the weatherstrip 10 lying near the door hinge in ensured reliable fashion, thereby making it possible to ensure the sealing performance.

Next, a fabrication method of fabricating the opening trim weatherstrip 10 will be described.

This opening trim weatherstrip 10 is formed through extrusion molding, and a solid rubber or a fine foamed material of which the trim portion 20 is formed and a sponge rubber of which the insert member 27 and the hollow seal portion 30 are formed can be extruded integrally by an extruding machine.

Thereafter, these materials are vulcanized by the general method and are then cut to a predetermined length for a single strip.

What is claimed is:

1. An opening trim weatherstrip that is configured to be mounted on a flange formed along a vehicle body opening portion circumferential edge of a motor vehicle to seal a gap between a motor vehicle door and the vehicle body opening portion circumferential edge, the opening trim weatherstrip comprising:
   a first section, which is configured to be mounted to a first part of the vehicle body opening portion circumferential edge that is near a hinge of the vehicle door;
   a second section, which is configured to be mounted to a second part of the vehicle body opening portion circumferential edge, wherein the first part and the second part are different parts of the vehicle body opening portion circumferential edge, and the first section and the second section are different sections of the opening trim weatherstrip;
   a mounting base portion, which is mounted on the flange; and
   a hollow seal portion, which is integral with the mounting base portion and is configured to abut with a door frame or an outer circumference of a door panel of the motor vehicle door to seal a gap between the motor vehicle door and the vehicle body opening portion circumferential edge, wherein the hollow seal portion includes:
a hollow root portion, which extends from the mounting base portion; and
a hollow extension portion, which extends transversely outwards from the hollow root portion, wherein a deformation rigidity of the hollow extension portion of the first section is higher than that of the second section,
a bending portion is formed on a hollow seal wall at a boundary between the hollow root portion and the hollow extension portion of the hollow seal portion,
the hollow extension portion is formed by a first side seal wall distal end portion, a second side seal wall distal end portion, and a hollow holding wall, and
the first side seal wall distal end portion and the second side seal wall distal end portion are relatively thick over the full length thereof, respectively, in the first section, in comparison to those of the second section.

2. The opening trim weatherstrip according to claim 1, wherein a wall thickness of at least a part of the hollow extension portion of the first section is greater than that of the second section.

3. The opening trim weatherstrip according to claim 2, wherein the entire hollow extension portion of the first section has the greater wall thickness.

4. The opening trim weatherstrip according to claim 2, wherein the hollow extension portion includes two opposed seal walls, and, in the first section, one of the two opposed seal walls has the greater wall thickness.

5. The opening trim weatherstrip according to claim 1, wherein a boundary seal wall extends near a boundary between the hollow extension portion and the hollow root portion of the hollow seal portion, and the boundary seal wall of the first section has a greater wall thickness than that of the second section.

6. The opening trim weatherstrip according to claim 2, wherein the wall thickness of at least a part the hollow extension portion changes gradually between the first section and the second section.

7. The opening trim weatherstrip according to according to claim 1, wherein the hollow root portion and the hollow extension portion of the hollow seal portion are separated by a holding wall.

8. The opening trim weatherstrip according to claim 1, wherein the hollow root portion and the hollow extension portion of the hollow seal portion are formed so that interior spaces of the hollow root portion and the hollow extension portion communicate with each other.

9. The opening trim weatherstrip according to claim 1, wherein the mounting base portion has a substantially U-shaped cross section made up of an outboard side wall, an inboard side wall and a bottom wall.

* * * * *